(12) United States Patent
Beattie

(10) Patent No.: US 7,971,694 B2
(45) Date of Patent: Jul. 5, 2011

(54) AUTOMATIC TRANSMISSION AND SHAFT SYSTEM THEREFOR

(75) Inventor: James C. Beattie, Baltimore, MD (US)

(73) Assignee: ATI Performance Products, Inc., Baltimore, MD (US)

( * ) Notice: Subject to any disclaimer, the term of this patent is extended or adjusted under 35 U.S.C. 154(b) by 357 days.

(21) Appl. No.: 12/081,791

(22) Filed: Apr. 21, 2008

(65) Prior Publication Data

US 2008/0318694 A1 Dec. 25, 2008

Related U.S. Application Data

(60) Provisional application No. 60/907,890, filed on Apr. 20, 2007.

(51) Int. Cl.
*F16D 33/00* (2006.01)

(52) U.S. Cl. .............. 192/3.21; 192/85.61; 464/183; 60/339; 60/330

(58) Field of Classification Search .............. None
See application file for complete search history.

(56) References Cited

U.S. PATENT DOCUMENTS

| | | | | | |
|---|---|---|---|---|---|
| 3,038,353 | A | * | 6/1962 | Roche | 475/159 |
| 4,098,382 | A | * | 7/1978 | Reedy et al. | 475/159 |
| 4,974,715 | A | * | 12/1990 | Koyama | 192/3.29 |
| 5,782,326 | A | * | 7/1998 | Souza | 192/3.26 |
| 6,892,533 | B2 | * | 5/2005 | Beattie | 60/339 |
| 7,234,577 | B2 | * | 6/2007 | Masuya | 192/3.29 |
| 7,648,013 | B2 | * | 1/2010 | Okada et al. | 192/48.601 |

* cited by examiner

*Primary Examiner* — David D Le
*Assistant Examiner* — Jacob S Scott
(74) *Attorney, Agent, or Firm* — Timothy J. Klima; Shuttleworth & Ingersoll, PLC

(57) ABSTRACT

A shaft system for an automatic transmission includes a stator support shaft having an internal axial bore for receiving an input shaft, a forward engagement portion for engaging a stator of a torque converter of the automatic transmission and an integral stator support flange extending radially outward for engaging a stator support of the automatic transmission and transferring to the stator support substantially all of a torque load imposed on the stator support shaft by the stator. The stator support flange includes at least one oil flow bore positioned therein to supply oil between different components of the transmission.

22 Claims, 10 Drawing Sheets

AUTOMATIC TRANSMISSION AND SHAFT SYSTEM THEREFOR

This application claims priority to U.S. Provisional Application 60/907,890, AUTOMATIC TRANSMISSION AND INPUT SHAFT THEREFOR, filed Apr. 20, 2007, the entirety of which is incorporated herein by reference.

The present invention is related to an automatic transmission and, in particular, to the input shaft and stator support shaft of an automatic transmission.

In a typical automatic transmission, such as for instance, a General Motors® Powerglide® transmission, a power input shaft 10 (see FIG. 1 PRIOR ART) includes an oil gallery 12 running axially through an interior of the input shaft 10 which is part of the oil management system of the transmission. See U.S. Pat. No. 6,892,533, issued May 17, 2005, of inventor James C. Beattie, the inventor of the present invention. Such application, in its entirety is incorporated by reference herein. The input shaft is positioned to rotate within an internal axial bore 22 of the stator support shaft 20. The input shaft includes a generally radial oil flow bore 14 connecting an exterior of the input shaft to the input shaft oil gallery 12. To provide control of the oil flow between the stator support shaft and the input shaft, it is necessary to provide two oil seals 16 and 18 between the input shaft 10 and the stator support shaft 20, positioned axially forward and rearward of the input shaft oil flow bore 14, respectively. The oil seals 16 and 18 are generally in the form of split metal rings so that they can be expanded to install over larger diameter portions of the input shaft 10.

The stator support shaft 20 includes two axially separated generally radial oil flow bores 24 and 26 connecting an exterior of the stator support shaft 20 to the internal axial bore 22 of the stator support shaft 20. The forward stator support shaft oil flow bore 24 is positioned axially forward of the forward input shaft oil seal 16 and the rearward stator support shaft oil flow bore 26 is positioned axially between the forward input shaft oil seal 16 and rearward input shaft oil seal 18 to be in generally axial alignment with the input shaft oil flow bore 14.

The oil flow is as follows. Hot oil flows from the torque converter 36 in the forward chamber 38 created between the stator support shaft 20 and the input shaft 10 to be blocked by the forward oil seal 16 and forced through the forward stator support shaft oil flow bore 24 to the oil cooler 30. The oil is then returned from the oil cooler 30 to the rearward stator support shaft oil flow bore 26 and into the chamber 40 created between the stator support shaft 20, the input shaft 10 and the two oil seals 16 and 18. The oil is then forced through the input shaft oil flow bore 14 to the input shaft oil gallery 12 where it can then be directed to further oil flow bores in the input shaft for cooling and lubrication of the direct clutches, the planetary gear set, the rear thrust washer and the input shaft pilot bushing. Each of the oil flow bores is critically sized to provide a desired downstream restriction to the oil flow and maintain the desired operating oil pressure in the torque converter for proper operation of the transmission. Oil flow bore 11 supplies oil to the clutch hub and drum bushing.

In a standard Powerglide® transmission, the oil seals 16 and 18 are positioned in circumferential oil seal grooves 32 and 34, respectively, cut into the exterior of the input shaft 10 on each side of the input shaft oil flow bore 14. Each oil seal groove 32, 34 then receives an oil seal 16, 18 that engages the internal axial bore 22 of the stator support shaft 20 to provide a sealing engagement between the input shaft 10 and the stator support shaft 20. The input shaft 10 includes turbine splines 42 at a forward end for engaging the turbine of the torque converter 36. The stator support shaft 20 includes stator splines 44 at a forward end for engaging the stator of the torque converter 36 and stator support splines 46 at a central portion for engaging the stator support and preventing rotation of the stator support shaft 20. The input shaft includes splines 48 for engaging the clutch hub and splines 49.

Such a transmission has disadvantages however. The General Motors® Powerglide® transmission was originally developed for vehicles generally producing significantly less than 300 horsepower. Although no longer in original equipment production, the Powerglide® transmission is now one of the most popular automatic transmissions used in drag racing vehicles. The power that these vehicles produce is often well in excess of 500 horsepower and can be in excess of 1500 horsepower. The additional torque produced by the engines of these vehicles is compounded by the fact that the torque converter 36 multiplies the torque of the engine, generally by as much as a factor of two or more, under low speed/high engine torque output conditions. Thus, this additional torque and power, coupled with the increased traction resulting from large, modern drag racing tires, places stresses on the transmission that were never envisioned in the original design.

As a result, the input shaft 10 has become a weak link in the transmission. In particular, the circumferential input shaft oil seal grooves 32 and 34 for receiving the oil seals 16 and 18 not only decrease the cross-sectional area and strength of the input shaft 10, they also create stress risers that can hasten input shaft failure such that input shaft breakage at one of the circumferential oil seal grooves has become commonplace in such transmissions used in high horsepower drag racing vehicles.

One approach to this input shaft breakage problem has been to forego the circumferential oil seal grooves and oil seals between the input shaft and the stator support shaft. This reduces power input shaft breakage but also reduces control of the oil flow with significant undesirable effects. For instance, since the oil is not properly routed as discussed above, torque converter discharge oil is allowed to enter the front of the transmission and is not effectively routed to the oil cooler and then to specific areas of the transmission for cooling and lubrication. Further, because of the loss of the restrictions in the oil flow caused by the sized oil flow bores in the standard Powerglide® transmission, the torque converter internal oil pressure cannot be effectively maintained for proper operation.

The '533 patent to Beattie introduced above provides one approach to increasing the strength of the input shaft. There, an input shaft 110 and stator support shaft 120 is shown in FIGS. 2 Prior Art and 3 Prior Art. The input shaft 110 does not include oil seal grooves 32 and 34. Therefore, the diameter of the input shaft in at least the area of the chamber 40 is increased and the stress risers caused by the oil seal grooves 32 and 34 eliminated. The stator support shaft 120 is provided with a forward oil seal groove 132 and a rearward oil seal groove 134 positioned on internal axial bore 22 of the stator support shaft to flank the rearward oil flow bore 26 and input shaft oil flow bore 14 when the stator support shaft 120 is assembled to the input shaft 110. The relative axial positioning of the oil flow bores 14, 24 and 26 is preferably, but not necessarily, the same as in the prior art shown in FIG. 1 Prior Art. Likewise, the relative axial positioning in the automatic transmission of the oil seal grooves 132 and 134 is preferably, though not necessarily, the same as the oil seal grooves 32 and 34 of the prior art shown in FIG. 1 Prior Art.

Oil seals 116 and 118 are respectively positioned in oil seal grooves 132 and 134 and provide a sealing contact between the stator support shaft 120 and the input shaft 110 to block off chamber 38 and create chamber 40. The oil seals 116 and 118 are annular in shape, constructed of Teflon and are somewhat flexible so that they can be easily inserted into the axial bore 22 and seated in the respective oil seal grooves 132 and 134. The oil seal grooves 132 and 134 have appropriate dimensions to receive and support the oil seals 116 and 118.

The oil flow is the same as in the prior art transmission shown in FIG. 1 Prior Art. That is, hot oil flows from the torque converter 36 in the forward chamber 38 created between the stator support shaft 120 and the input shaft 110 to be blocked by the forward oil seal 116 and forced through the forward stator support shaft oil flow bore 24 to the oil cooler 30. The oil is then returned from the oil cooler 30 to the rearward stator support shaft oil flow bore 26 and into the chamber 40 created between the stator support shaft 120, the input shaft 110 and the two oil seals 116 and 118. The oil is then forced through the input shaft oil flow bore 14 to the input shaft oil gallery 12 where it can then be directed to further oil flow bores in the input shaft for cooling and lubrication of the direct clutches, the planetary gear set, the rear thrust washer and the input shaft pilot bushing. Each of the oil flow bores is critically sized to provide a desired downstream restriction to the oil flow and maintain the desired operating oil pressure in the torque converter 36 for proper operation of the transmission.

The engagement of the stator support splines 46 of the stator support shaft 120 with the stationary stator support assures that all (or nearly all) of the torque load placed on the stator support shaft 120 by the stator of the torque converter 36 is imparted on the stator support. No torque load is placed on the stator support shaft 120 rearward of the stator support splines 46 by the stator. The only torque load imposed on the this rearward portion of the stator support shaft 120 is from drag imposed by the oil seals 116 and 118 contacting the rotating input shaft 110. Therefore, although the grooves 132 and 134 are cut into the stator support shaft 120, they do not significantly weaken the stator support shaft 120 because they are positioned rearward of the stator support splines 46 where there is no significant torque loading. This is in contrast to the grooves 32 and 34 of the prior art input shaft 10, where the grooved portion of the shaft can generally expect to encounter at least twice the torque output of the engine during routine operation. Such a prior art automatic transmission has increased power handling capabilities over the prior art transmission shown in FIG. 1 Prior Art while maintaining proper oil flow in the transmission. The input shaft 110 has an increased diameter as compared to the input shaft of FIG. 1 Prior art for additional strength without eliminating oil control seals between the input shaft 110 and the stator support shaft 120. The stator support shaft 120 and input shaft 110 of FIGS. 2 and 3 Prior Art can be used in an automatic transmission without requiring modification of other components of the transmission.

While such a prior art input shaft and automatic transmission as shown in FIGS. 2 and 3 Prior Art has been a substantial improvement over the previous art, it has been found that even such a modified transmission can still incur broken or damaged input shafts when exposed to extremely high horsepower and traction situations. In particular, the shift between first gear and second gear is particularly abrupt and violent because the shift is from a 1.80-1 drive to direct 1-1 drive with the clutches applied at 250 psi of line pressure to essentially lock the transmission in direct drive and it has been found that the input shaft 110 is being damaged or broken somewhere in the torque transmission path through the input shaft for second gear. That is, torque is transmitted into the front of the input shaft 110 through the inner race and travels through the shaft to a central spline which engages the clutch hub. While the input shaft 110 has typically handled the torque transmitted through the input shaft for first gear (through the inner race and travels through the shaft to a rear spline which engages the sun gear), upon the abrupt and violent shift to second gear, the input shaft has been known to fail between the inner race and the clutch hub under extreme conditions.

The present invention includes a shaft system for an automatic transmission includes a stator support shaft having an internal axial bore for receiving an input shaft, a forward engagement portion for engaging a stator of a torque converter of the automatic transmission and an integral stator support flange extending radially outward for engaging a stator support of the automatic transmission and transferring to the stator support substantially all of a torque load imposed on the stator support shaft by the stator. The stator support flange includes at least one oil flow bore positioned therein to supply oil between different components of the transmission. The present invention also includes a transmission incorporating the improved shaft system.

It is an object of the present invention to provide an automatic transmission that overcomes the above disadvantages.

It is a further object of the present invention to provide an automatic transmission having increased power handling capabilities.

It is a further object of the present invention to provide an automatic transmission having increased power handling capabilities while maintaining proper oil flow in the transmission.

It is a further object of the present invention to provide an input shaft for an automatic transmission that is stronger than a standard input shaft while retaining the proper oil flow in the transmission.

It is a further object of the present invention to provide an input shaft for an automatic transmission having an increased diameter for additional strength without eliminating oil control seals between the input shaft and the stator support shaft.

Further objects and advantages of the present invention will be apparent from the description of the invention below read in conjunction with the accompanying Figures, wherein like reference numerals indicate like components.

Figure 1:
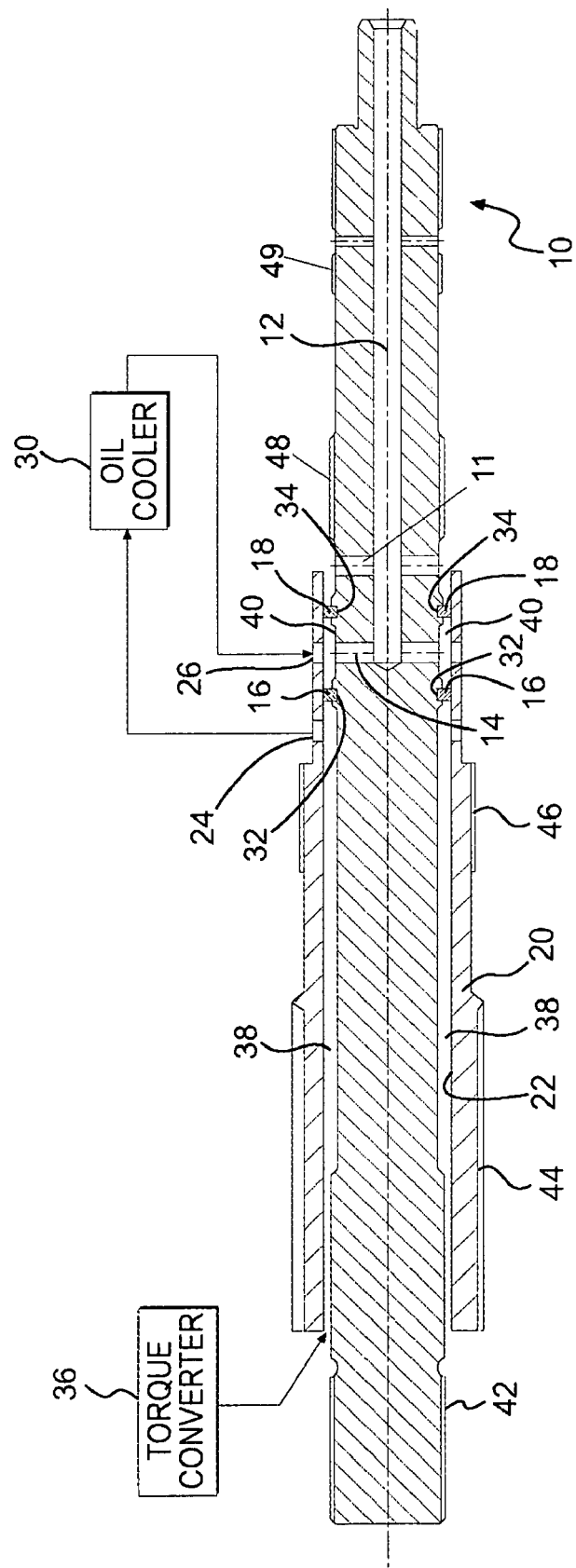
FIG. 1 (PRIOR ART) shows a sectional view of a conventional input shaft and stator support shaft for an automatic transmission.
Figure 2:
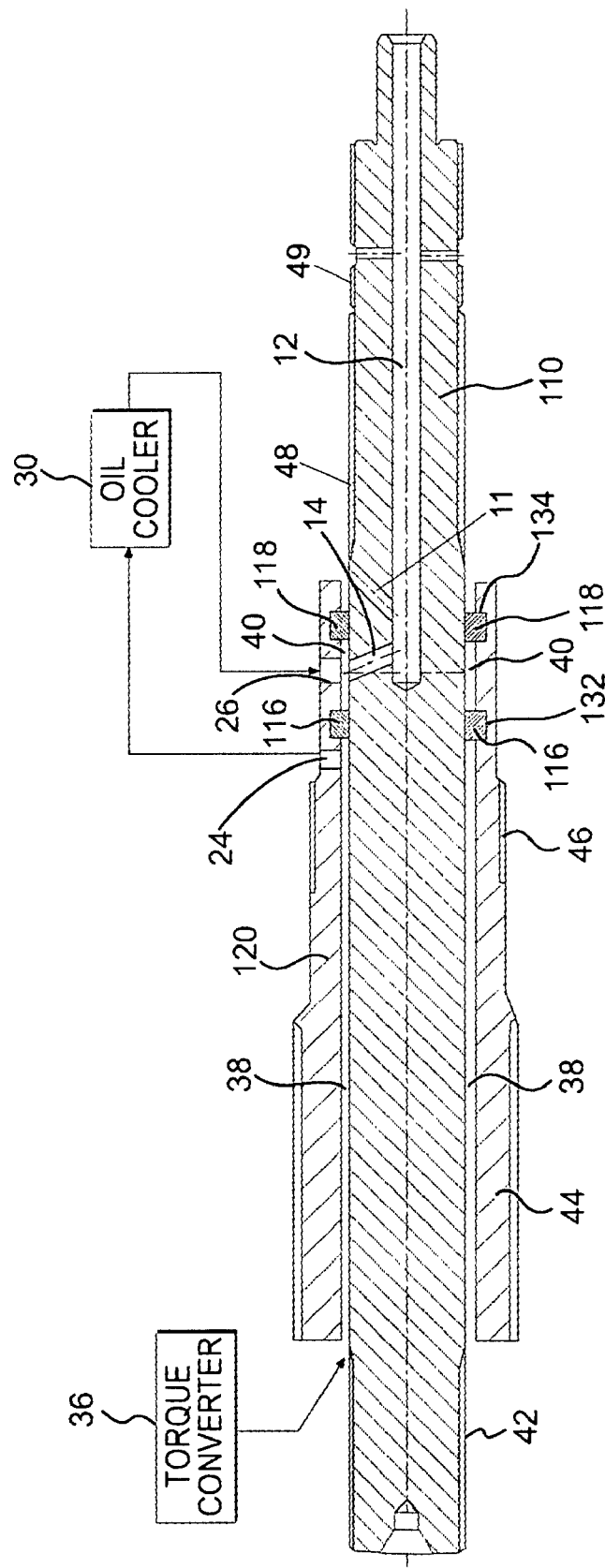
FIG. 2 (PRIOR ART) shows a sectional view of a known improved input shaft and stator support shaft for an automatic transmission.
Figure 3:
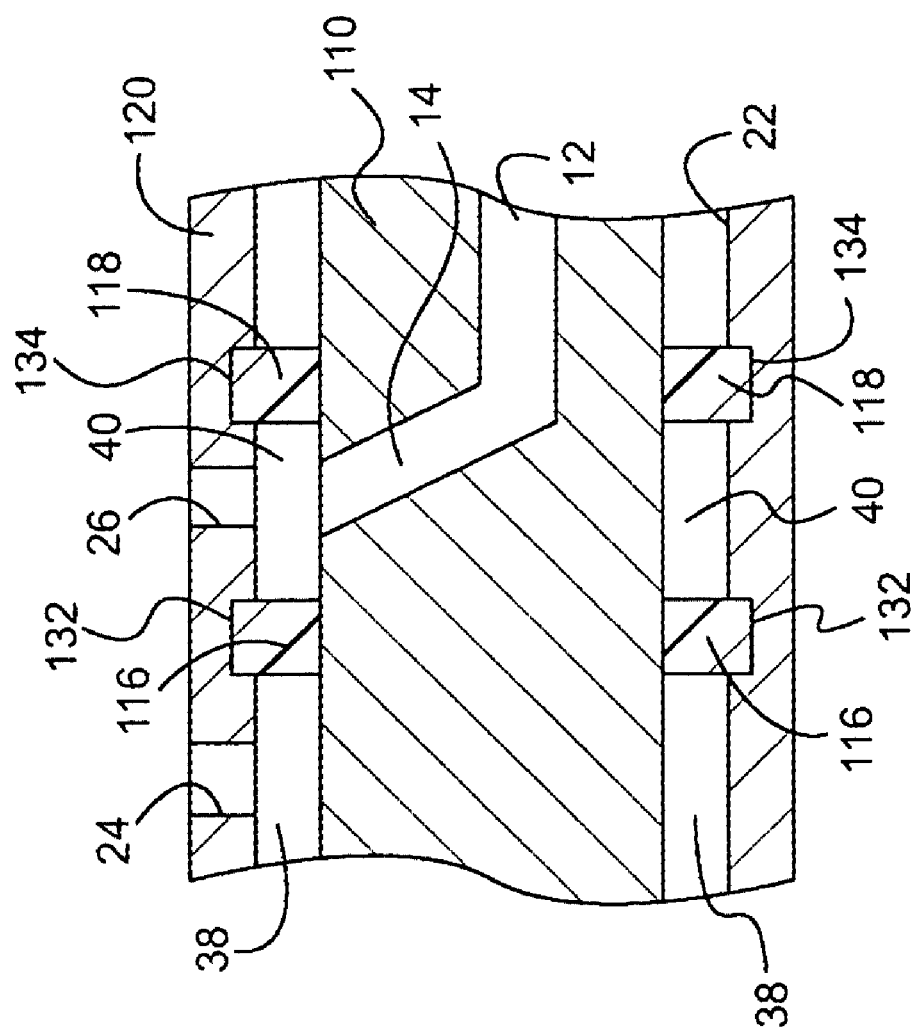
FIG. 3 (PRIOR ART) shows an enlarged partial sectional view of the input shaft and stator support shaft of FIG. 2 (PRIOR ART)
Figure 5:
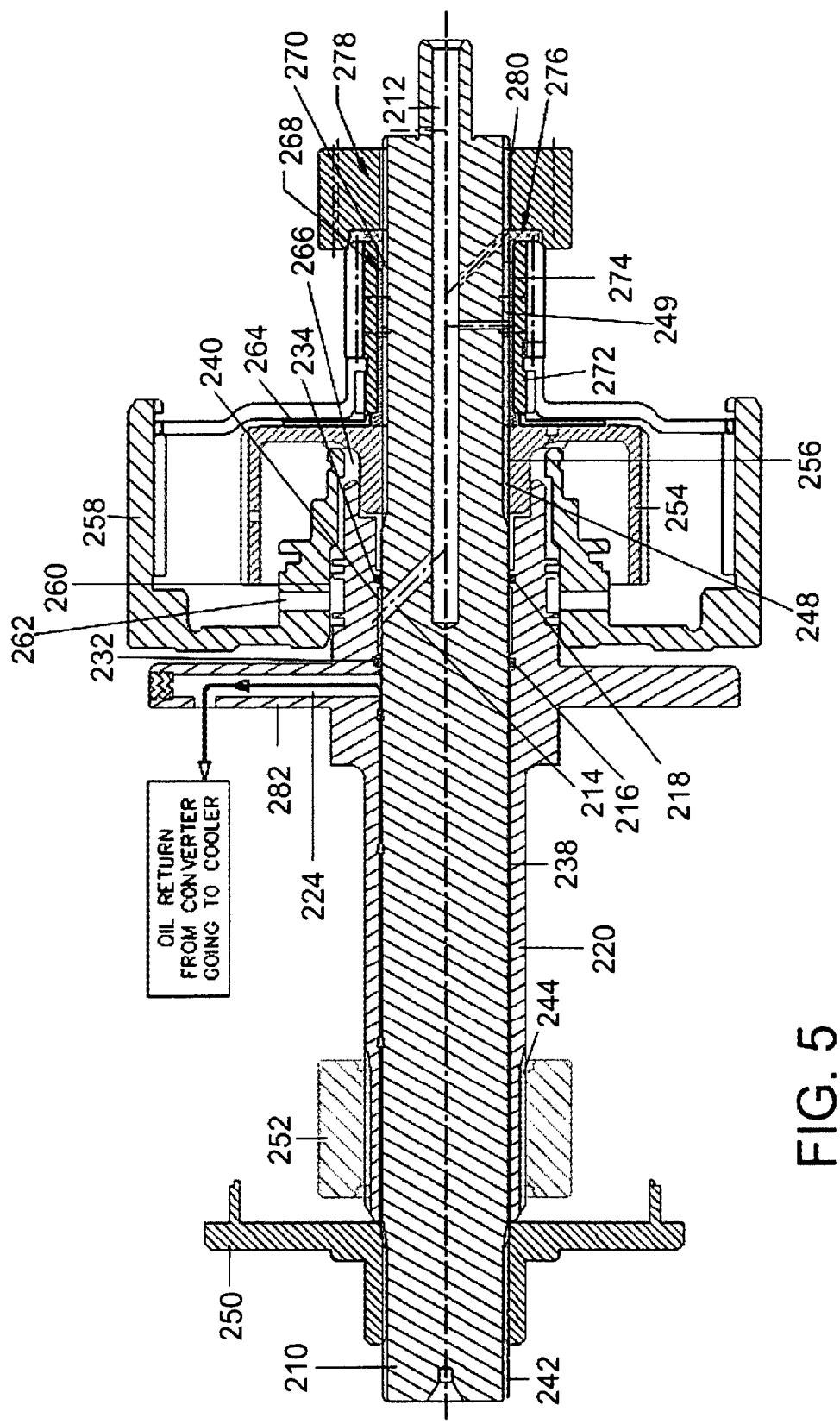
FIG. 5 shows a partial sectional view, taken along section line 5-5 of FIG. 9, of an input shaft assembly of a first embodiment of the present invention, showing a first portion of an oil circuit.
Figure 9:
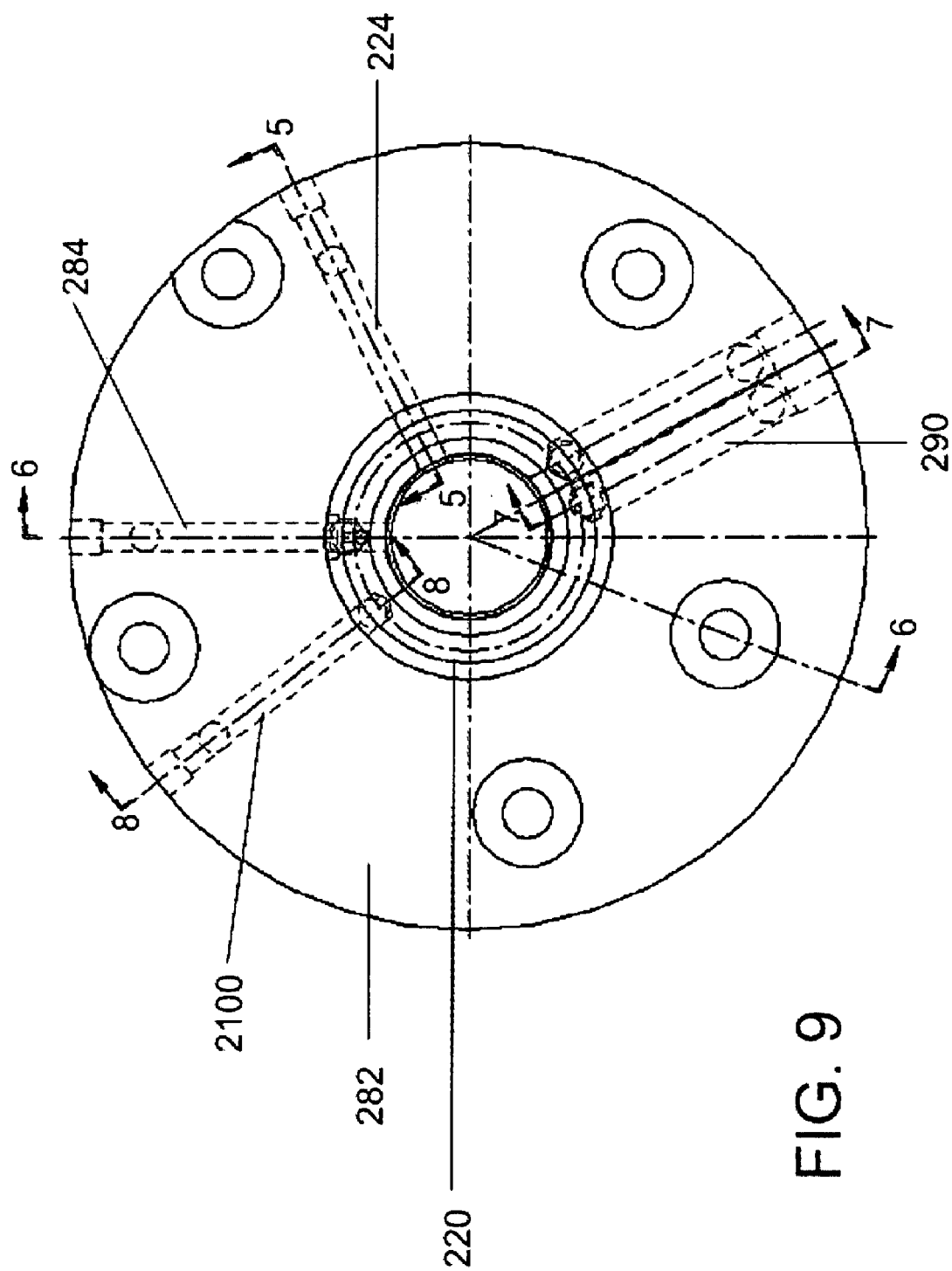
FIG. 9 shows an axial view of a stator support tube of the embodiment of FIGS. 5-8.

FIGS. 1-3 are discussed above. FIG. 5 shows a partial sectional view, taken along section line 5-5 of FIG. 9, of an input shaft assembly of a first embodiment of the present invention, showing a first portion of an oil circuit. Reference numerals used with respect to this first embodiment of the present invention follow the reference numerals used in discussing the prior art embodiments, but starting in a 200 series. Reference numerals used with respect to a second embodiment of the present invention discussed below follow the reference numerals used in discussing the prior art and first embodiments, but starting in a 300 series.

The input shaft 210 of the first embodiment of the present invention has a nominal outer diameter larger than a nominal outer diameter of prior art input shaft 10. In a preferred embodiment, this larger nominal diameter is between 1.0625 inch and 1.1875 inch, although the input shaft 210 can have a larger or smaller nominal diameter. This larger nominal diameter requires changes in a number of components that the input shaft 210 interacts with, since the prior art components are not sufficiently sized to accommodate the larger input shaft 210. Therefore, in order to accommodate the larger input shaft 210, the following is required:

- stator support shaft 220 having a larger internal and external diameter;
- turbine hub 250 having a larger splined internal diameter;
- inner race 252 having a larger splined internal diameter;
- clutch hub 254 having a larger splined internal diameter 256;
- clutch drum 258 having a larger internal diameter 260 which rides on stator support shaft 220;
- spacer A 264 between clutch hub 254 and a flange gear 272;
- flange gear bushing 268 having a larger inner diameter 270;
- flange gear 272 having a larger internal diameter 274;
- spacer B 276 between flange gear bushing 268 and sun gear 278 having a larger internal diameter 280.

In addition, the splines 46 of the prior art shafts are dispensed with as being incapable to handle the torque through the stator support shaft 220. Therefore, a radially extending flange 282 is integrally manufactured with the stator support shaft 220. In the presently preferred embodiment, this is be done by machining from a single piece of billet material, but the material can be formed, forged or cast. Alternatively, the piece can be constructed of welded up components. Radially extending flange 282 carries a number of internal oil passages, as shown in FIGS. 5-9, and discussed further below. Stator support shaft includes a larger external spline 244 for engaging inner race 252 and also includes a larger diameter portion 283 (see FIG. 7) for supporting clutch drum 258. This larger diameter portion 283 includes spaced apart grooves 296 and 298 to receive seals 292 and 294, respectively to provide an oil tight passage between oil passage 290 in stator support shaft 220 and clutch drum pressurized oil feed port 262.

Because of the larger diameter of the input shaft 210 and stator support shaft 220, the conventional oil routing shown in FIGS. 1 and 2 cannot be utilized. Therefore, the oil seals 216 and 218 are moved forward on the stator support shaft 220 and oil passages are routed through the flange 282 to provide the necessary oil routing, thereby provide additional space behind to increase the diameters. As shown in FIG. 5, oil from the torque converter 36 is routed through the forward chamber 238 between the input shaft 210 and the stator support shaft 220 until it reaches seal 216. It there exits the forward chamber 238 via oil passage 224 in flange 282 and is thereafter routed to the oil cooler 30. Also see FIG. 9 for another perspective on the oil routing through the support shaft 220 and flange 282.

Figure 6:
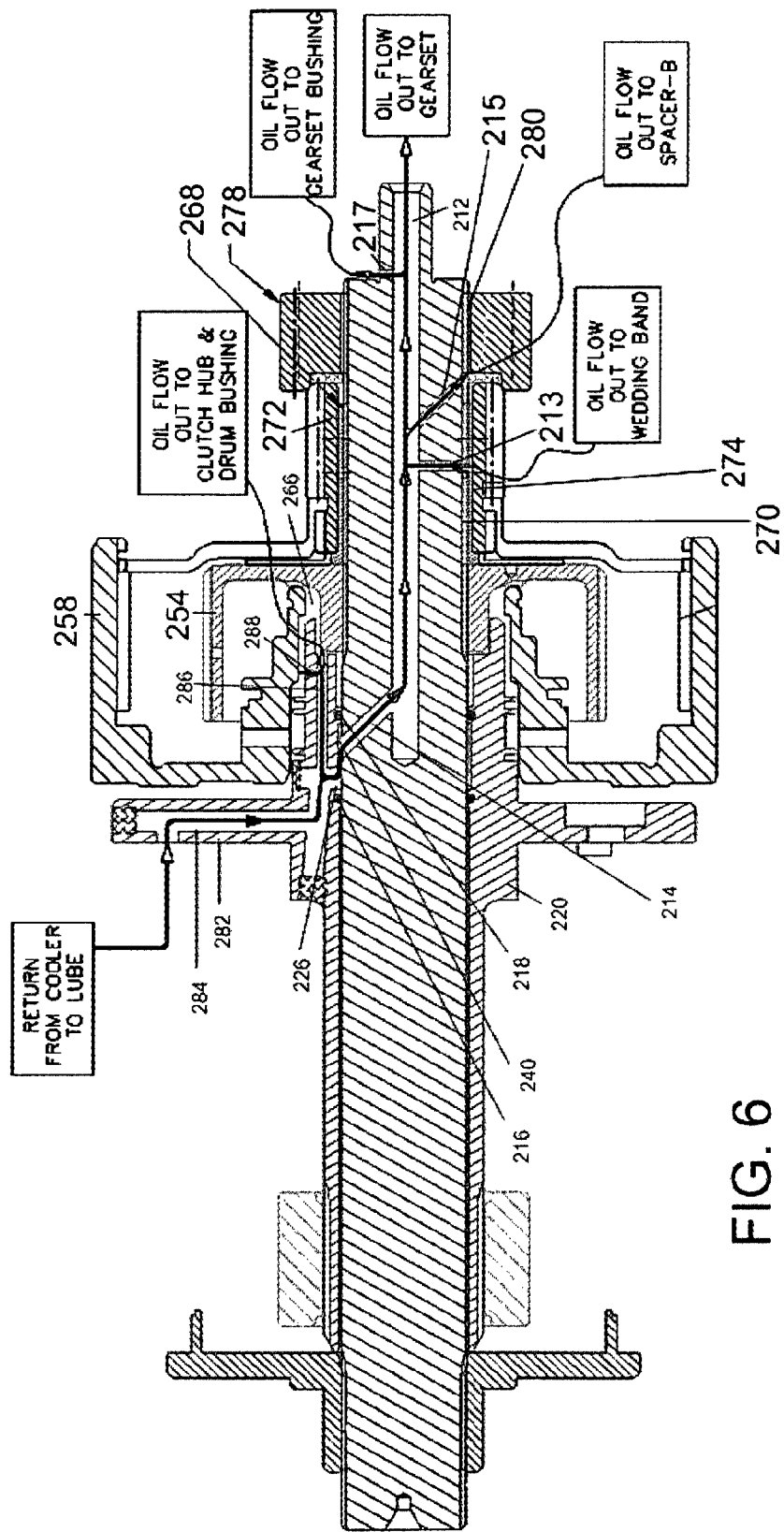
FIG. 6 shows a partial sectional view, taken along section line 6-6 of FIG. 9, of the input shaft assembly of FIG. 5, showing a second portion of an oil circuit.

As shown in FIG. 6, oil returns from the oil cooler 30 and is routed into oil passage 284 in flange 282. The oil flows through passage 284 and a portion of the oil branches off and flows through oil flow bore 226 in the stator support shaft 220 into the oil chamber 40 created between the input shaft 210, the stator support shaft 220 and the oil seals 216 and 218 and thereupon flows into oil flow bore 214 in input shaft 210. It continues flowing through oil flow bore 214 into oil flow bore 212, also in input shaft 210. It thereafter flows through oil passages 213, 215 and 217 in input shaft 210 to respectively lubricate the flange gear bushing 268, spacer B 276 and the gearset bushing (not shown). The remainder of the oil flows out the end of oil passage 212 to lubricate the gearset (not shown). The portion of the oil flowing through the oil passage 284 that didn't flow through the oil flow bore 226 continues to flow through oil passage 286 in the stator support shaft 220 into oil galley 266 between the clutch hub 254 and clutch drum 258 to lubricate the clutch hub 254 and the clutch drum bushing. Oil also flows from oil passage 286 through oil passage 288 to lubricate the clutch drum 258. By providing oil passage 286 in the stator support shaft 220, the oil flow bore 11 in the prior art designs can be removed from the input shaft 210. Previously, such oil flow bores 11 were positioned directly in the torque path through the input shaft 10/110, thereby weakening the input shaft in this critical area. Providing an alternative oil route such that oil flow bore 11 can be removed from the shaft, i.e., never placed in the input shaft, creates a stronger input shaft 210 in this critical area.

Figure 7:
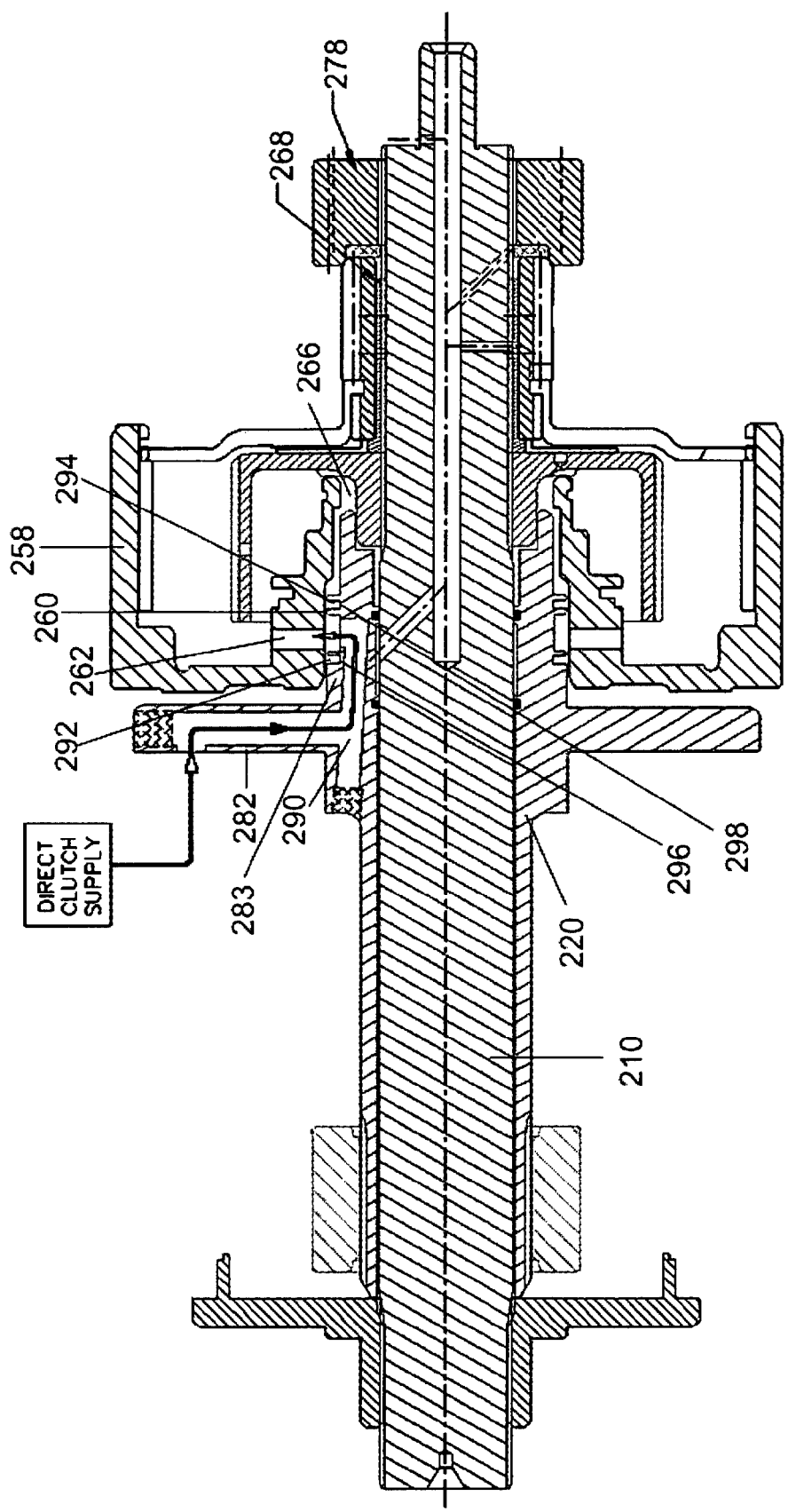
FIG. 7 shows a partial sectional view, taken along section line 7-7 of FIG. 9, of the input shaft assembly of FIG. 5, showing a third portion of an oil circuit.

As shown in FIG. 7, oil flows from a pressurized source in the valve block through oil passage 290 in flange 282 and stator support shaft 220 and larger diameter portion 283 of stator support shaft, between oil seals 292 and 294 and into oil passage 262 in the clutch drum 258 to pressurize the clutch pack. To provide a necessary volume of oil passage 290 to flow the necessary volume of oil, the radially extending portion of the oil passage 290 is formed by two overlapping drilled/milled holes to create the necessary volume within the limits of the thickness of flange 282. Alternatively, three or more radially drilled/milled holes can be overlapped to alter the volume of oil passage 290.

Figure 8:
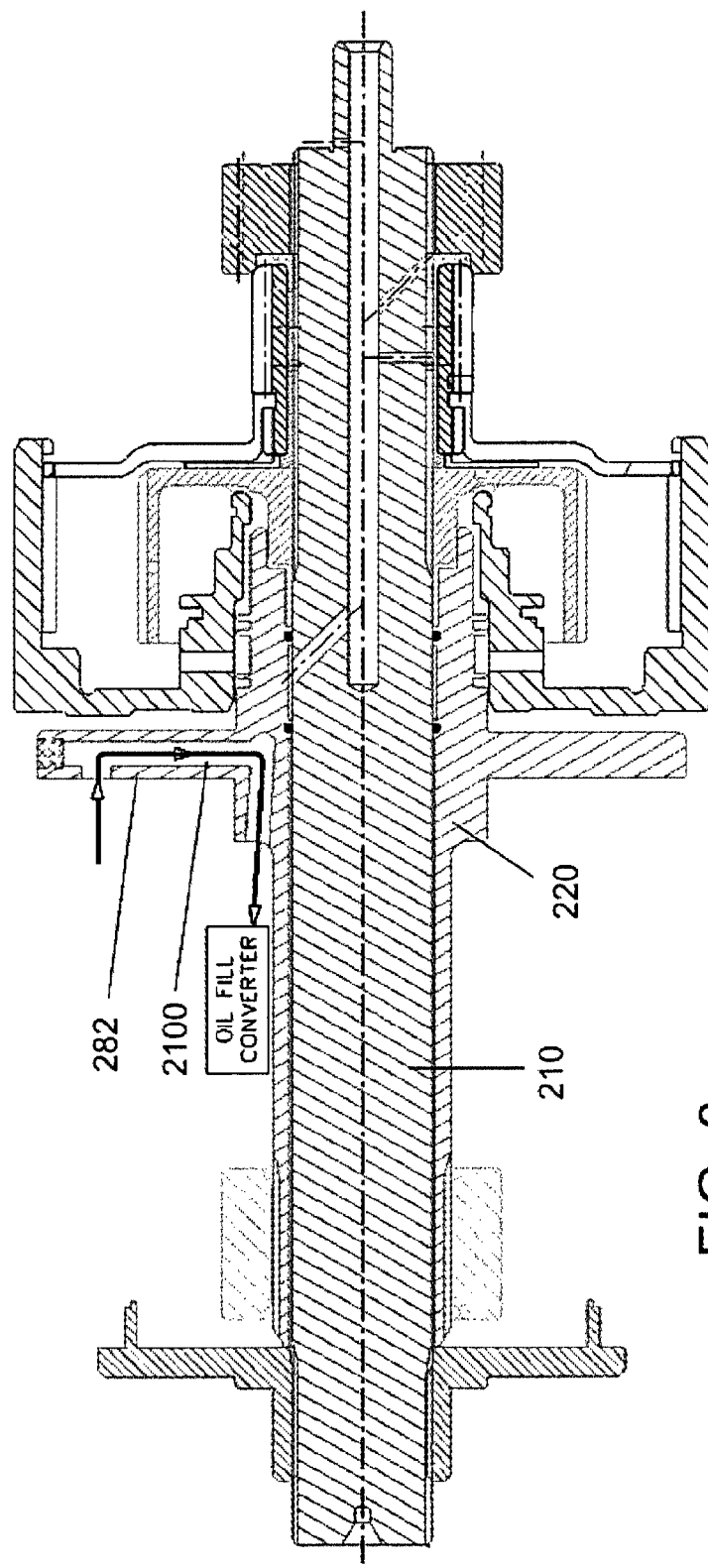
FIG. 8 shows a partial sectional view, taken along section line 8-8 of FIG. 9, of the input shaft assembly of FIG. 5, showing a fourth portion of an oil circuit.

As shown in FIG. 8, oil flows into oil passage 2100 of flange 282 to return to the oil fill of the torque converter 36.

Referring to FIGS. 5-9 generally, according to one embodiment, a shaft system for an automatic transmission includes a stator support shaft, and having:

1) an internal axial bore for receiving an input shaft;
2) a forward engagement portion having a male portion for engaging a counterpart female portion of a stator of a torque converter of the automatic transmission;
3) a stator support flange integrally part of the stator support shaft and extending radially outward for engaging a stator support of the automatic transmission and transferring to the stator support substantially all of a torque load imposed on the stator support shaft by the stator, the stator support flange including at least one oil flow bore positioned therein to supply oil between different components of the transmission; the at least one oil flow bore maintained in an oil tight condition between the internal axial bore and the stator support flange via the integral construction of the stator support flange with the stator support shaft;
4) a rearward portion positioned rearward of the stator support flange and including a radially outwardly extending portion for supporting a clutch drum;

5) the internal axial bore having a cylindrical portion extending from the forward engagement portion to at least a forward face of the stator support flange;
6) the male portion of the forward engagement portion having inner radius and outer radius portions for engaging counterpart inner radius and outer radius portions of the female portion of the stator, the inner radius portions of the male portion establishing a solid minimum cross-sectional thickness extending radially outward from the internal axial bore, with substantially an entire length and circumference of the stator support shaft extending from the forward engagement portion to the forward face of the stator support flange having a solid cross-sectional thickness measured from the internal axial bore at least as thick as the minimum cross-sectional thickness;
7) the at least one oil flow bore of the stator support flange including a first oil flow bore for returning oil to an oil fill of a torque converter, the first oil flow bore positioned at least one of radially outside of the minimum cross-sectional thickness of the stator support shaft and axially behind the forward face of the stator support flange;
8) the at least one oil flow bore of the stator support flange including a second oil flow bore connecting the internal axial bore with an exterior of the stator support shaft for allowing oil from the torque converter flowing between the stator support shaft and the input shaft to flow to an exterior of the stator support shaft;
9) a first internal circumferential oil seal groove positioned in the internal axial bore rearward of the second oil flow bore on one of the stator support flange and the rearward portion, the first oil seal groove constructed and arranged to receive a first oil seal for establishing a sealing engagement between the stator support shaft and the input shaft and for blocking an axial flow of the oil from the torque converter between the stator support shaft and the input shaft and forcing that flow of oil into the second oil flow bore.

In such embodiment, the stator support flange can include a forward portion extending radially outwardly from the internal axial bore, the stator support flange forward portion having an outer diameter less than a maximum diameter of the stator support flange but greater than a diameter of the stator support shaft between the forward engagement portion and the stator support flange. An axially extending portion of the first oil flow bore can be forwardly routed through the stator support flange forward portion with an outlet of the first oil flow bore positioned radially outwardly from the diameter of the stator support shaft between the forward engagement portion and the stator support flange.

In such embodiment, the second oil flow bore can be positioned entirely axially forward of a rearward face of the stator support flange and the first internal circumferential oil seal groove can be positioned immediately adjacent the second oil flow bore rearward of the second oil flow bore.

Figure 10:
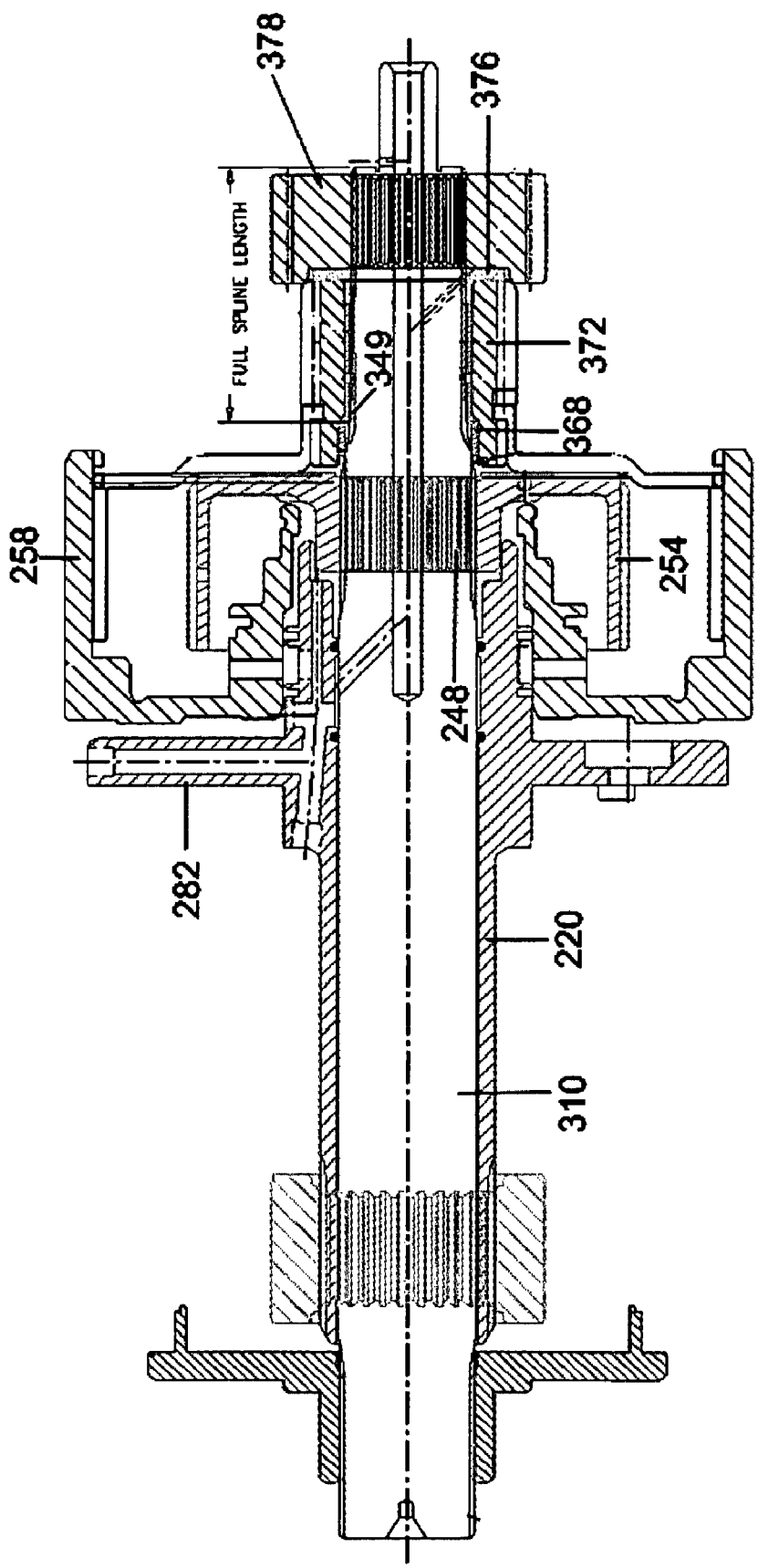
FIG. 10 shows a partial sectional view of an input shaft assembly of a second embodiment of the present invention.

An alternative embodiment is shown in FIG. 10. Here, the input shaft 310 is the same or similar to input shaft 210 in the critical second gear torque path from the connection with the clutch drum 254 forward. However, in the less critical portion of the input shaft 310 rearward of the clutch drum connection, it is believed that a smaller diameter will suffice for the input shaft 310. This allows further thickness to be added to the flange gear, which can be on the verge of becoming the weak link in the assembly with the embodiment of input shaft 210. To utilize the input shaft 310 having a smaller diameter rearward of the clutch hub connection, only the new input shaft 310 and a new flange gear 372, flange gear bushing 368, spacer B 376 and sun gear 378 (and possibly spacer A 264), need be exchanged as compared to the embodiment shown in FIGS. 5-8. The smaller rear diameter of input shaft 310 would preferably be between a nominal 1 inch, as in the prior art designs, and a nominal 1.1875 inch, as in the embodiment of FIGS. 5-8. Such a two diameter input shaft 310 allows extra material to be placed in the overall assembly where it is need to cope with applied forces, and, perhaps counterintuitively, is believed to increase the strength of the overall assembly and transmission by using an input shaft 310 which has a portion having a smaller diameter than the comparative uniform diameter input shaft 210. If a one inch nominal diameter is used for this rearward portion of the input shaft 310, the new flange gear 372, flange gear bushing 368, spacer B 376 and sun gear 378 (and possibly spacer A 364) can be the conventional components used with the input shaft 110 and would not require new designs of such components.

Figure 4:
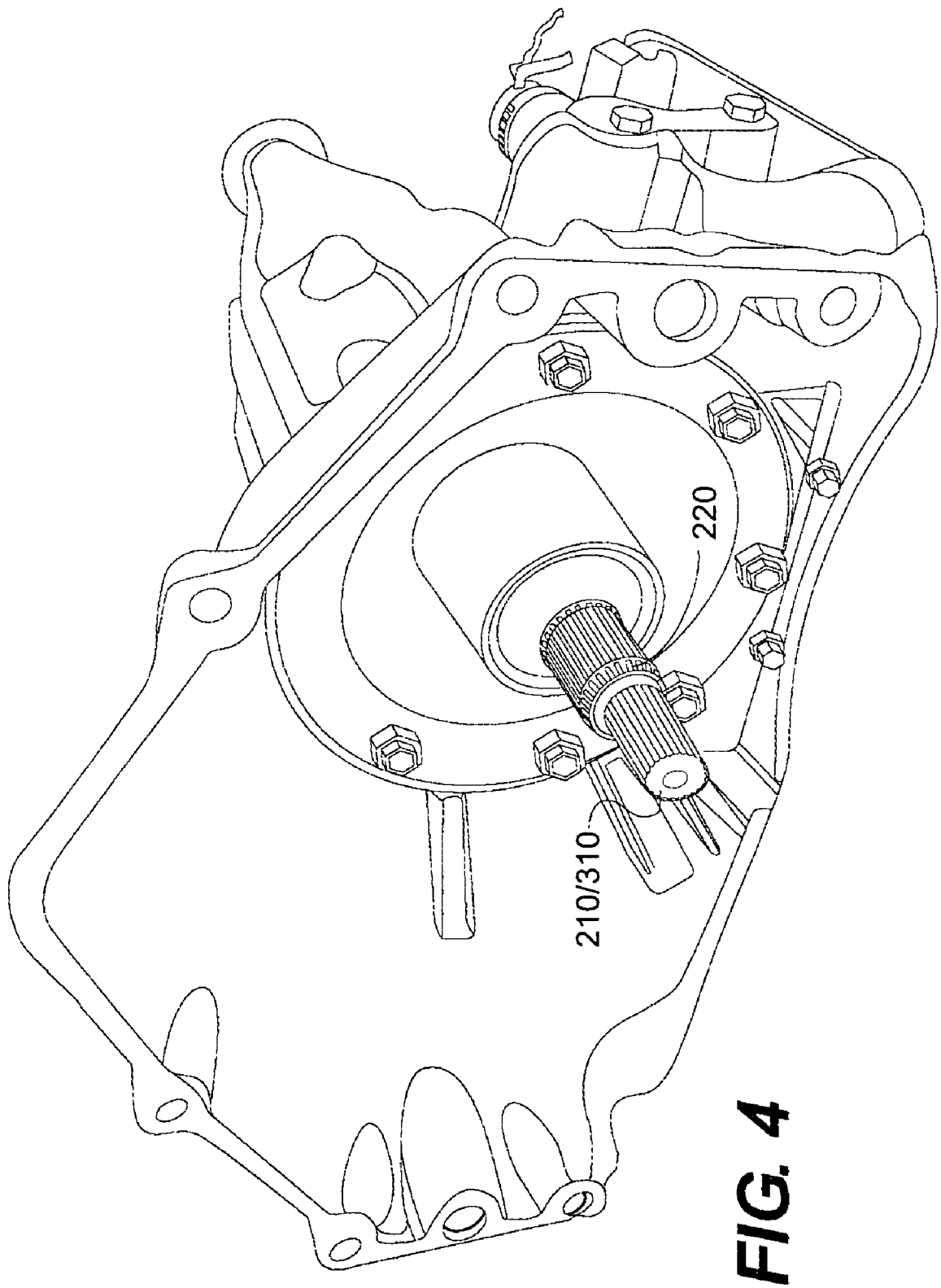
FIG. 4 shows a perspective view of an automatic transmission incorporating the input shaft and stator support shaft of the present invention.

FIG. 4 shows a perspective view of an automatic transmission incorporating the input shaft 210/310 and stator support shaft 220 of the present invention.

The present invention can be used with automatic transmissions other than a General Motors® Powerglide® transmission. It is also intended that the invention can be used with respect to other shafts or components in all areas of an automatic transmission or hydraulically operated machine.

Various aspects of the different embodiments can be combined in different combinations to create new embodiments within the scope of the invention.

The Figures shown herein are not to scale.

What is claimed is:
1. A shaft system for an automatic transmission, comprising:
   a stator support shaft, comprising:
      an internal axial bore for receiving an input shaft;
      a forward engagement portion having a male portion for engaging a counterpart female portion of a stator of a torque converter of the automatic transmission;
      a stator support flange integrally part of the stator support shaft and extending radially outward for engaging a stator support of the automatic transmission and transferring to the stator support substantially all of a torque load imposed on the stator support shaft by the stator, the stator support flange including at least one oil flow bore positioned therein to supply oil between different components of the transmission; the at least one oil flow bore maintained in an oil tight condition between the internal axial bore and the stator support flange via the integral construction of the stator support flange with the stator support shaft;
      a rearward portion positioned rearward of the stator support flange and including a radially outwardly extending portion for supporting a clutch drum;
      the internal axial bore having a cylindrical portion extending from the forward engagement portion to at least a forward face of the stator support flange;
      the male portion of the forward engagement portion having inner radius and outer radius portions for engaging counterpart inner radius and outer radius portions of the female portion of the stator, the inner radius portions of the male portion establishing a solid minimum cross-sectional thickness extending radially outward from the internal axial bore, with substantially an entire length and circumference of the stator support shaft extending from the forward engagement portion to the forward face of the stator support flange having a solid cross- sectional thickness measured from the internal axial bore at least as thick as the minimum cross-sectional thickness;

the at least one oil flow bore of the stator support flange including a first oil flow bore for returning oil to an oil fill of a torque converter, the first oil flow bore positioned at least one of radially outside of the minimum cross-sectional thickness of the stator support shaft and axially behind the forward face of the stator support flange;

the at least one oil flow bore of the stator support flange including a second oil flow bore connecting the internal axial bore with an exterior of the stator support shaft for allowing oil from the torque converter flowing between the stator support shaft and the input shaft to flow to an exterior of the stator support shaft;

a first internal circumferential oil seal groove positioned in the internal axial bore rearward of the second oil flow bore on one of the stator support flange and the rearward portion, the first oil seal groove constructed and arranged to receive a first oil seal for establishing a sealing engagement between the stator support shaft and the input shaft and for blocking an axial flow of the oil from the torque converter between the stator support shaft and the input shaft and forcing that flow of oil into the second oil flow bore.

2. The shaft system of claim 1, wherein:

the at least one oil flow bore of the stator support flange includes a third oil flow bore connecting the internal axial bore with an exterior of the stator support shaft for allowing oil to flow from an exterior of the shaft to the internal axial bore, the third oil flow bore having a first portion positioned in the stator support flange to receive oil from an exterior of the stator support shaft, the first portion connecting to a second portion positioned in the radially outwardly extending portion of the rearward portion of the stator support shaft to supply oil to a clutch hub and drum bushing for lubrication.

3. The shaft system of claim 1, wherein the stator support flange includes a forward portion extending radially outwardly from the internal axial bore, the stator support flange forward portion having an outer diameter less than a maximum diameter of the stator support flange but greater than a diameter of the stator support shaft between the forward engagement portion and the stator support flange; an axially extending portion of the first oil flow bore being forwardly routed through the stator support flange forward portion with an outlet of the first oil flow bore positioned radially outwardly from the diameter of the stator support shaft between the forward engagement portion and the stator support flange.

4. The shaft system of claim 1, wherein the second oil flow bore is positioned entirely axially forward of a rearward face of the stator support flange and the first internal circumferential oil seal groove is positioned immediately adjacent the second oil flow bore rearward of the second oil flow bore.

5. The shaft system of claim 1, and further comprising:

a second internal circumferential oil seal groove positioned in the internal axial bore of the rearward portion of the stator support shaft rearward of the first oil seal groove, the second oil seal groove constructed and arranged to receive a second oil seal for establishing a sealing engagement between the stator support shaft and the input shaft and creating an oil chamber between the stator support shaft, the input shaft and the first oil seal.

6. The shaft system of claim 5, wherein:

the at least one oil flow bore of the stator support flange includes a third oil flow bore connecting the internal axial bore with an exterior of the stator support shaft for allowing oil to flow from an exterior of the shaft to the internal axial bore, the third oil flow bore having a first portion positioned in the stator support flange to receive oil from an exterior of the stator support shaft, the first portion connecting to a second portion positioned in the radially outwardly extending portion of the rearward portion of the stator support shaft to supply oil to a clutch hub and drum bushing for lubrication.

7. The shaft system of claim 6, wherein:

the second portion of the third oil flow bore also connects to an interior of the stator support shaft between the first and second oil seal grooves to supply oil to the oil chamber, wherein the oil chamber is axially positioned to connect to an input shaft oil flow bore positioned in the input shaft and pass oil from the exterior of the stator support shaft to the input shaft oil flow bore.

8. The shaft system of claim 7, wherein the stator support flange includes a forward portion extending radially outwardly from the internal axial bore, the stator support flange forward portion having an outer diameter less than a maximum diameter of the stator support flange but greater than a diameter of the stator support shaft between the forward engagement portion and the stator support flange; an axially extending portion of the first oil flow bore being forwardly routed through the stator support flange forward portion with an outlet of the first oil flow bore positioned radially outwardly from the diameter of the stator support shaft between the forward engagement portion and the stator support flange.

9. The shaft system of claim 8, wherein the second oil flow bore is positioned entirely axially forward of a rearward face of the stator support flange and the first internal circumferential oil seal groove is positioned immediately adjacent the second oil flow bore rearward of the second oil flow bore.

10. The shaft system of claim 7, wherein:

the at least one oil flow bore of the stator support flange includes a fourth oil flow bore connecting between a pressurized oil source external of the stator support shaft and the clutch drum to pressurize a clutch pack, the fourth oil flow bore having a first portion positioned in the stator support flange and connecting to a second portion positioned in the radially outwardly extending portion of the rearward portion of the stator support shaft to connect to an oil passage in the clutch drum.

11. The shaft system of claim 10, and further comprising:

a pair of oil seals positioned on opposite sides of the connection between the fourth oil flow bore and the oil passage in the clutch drum to seal such connection.

12. An automatic transmission, comprising:

an input shaft;

a stator support shaft, comprising:

an internal axial bore for receiving the input shaft;

a forward engagement portion having a male portion for engaging a counterpart female portion of a stator of a torque converter of the automatic transmission;

a stator support flange integrally part of the stator support shaft and extending radially outward for engaging a stator support of the automatic transmission and transferring to the stator support substantially all of a torque load imposed on the stator support shaft by the stator, the stator support flange including at least one oil flow bore positioned therein to supply oil between different components of the transmission; the at least one oil flow bore maintained in an oil tight condition between the internal axial bore and the stator support flange via the integral construction of the stator support flange with the stator support shaft;

a rearward portion positioned rearward of the stator support flange and including a radially outwardly extending portion for supporting a clutch drum;

the internal axial bore having a cylindrical portion extending from the forward engagement portion to at least a forward face of the stator support flange;

the male portion of the forward engagement portion having inner radius and outer radius portions for engaging counterpart inner radius and outer radius portions of the female portion of the stator, the inner radius portions of the male portion establishing a solid minimum cross-sectional thickness extending radially outward from the internal axial bore, with substantially an entire length and circumference of the stator support shaft extending from the forward engagement portion to the forward face of the stator support flange having a solid cross-sectional thickness measured from the internal axial bore at least as thick as the minimum cross-sectional thickness;

the at least one oil flow bore of the stator support flange including a first oil flow bore for returning oil to an oil fill of a torque converter, the first oil flow bore positioned at least one of radially outside of the minimum cross-sectional thickness of the stator support shaft and axially behind the forward face of the stator support flange;

the at least one oil flow bore of the stator support flange including a second oil flow bore connecting the internal axial bore with an exterior of the stator support shaft for allowing oil from the torque converter flowing between the stator support shaft and the input shaft to flow to an exterior of the stator support shaft;

a first internal circumferential oil seal groove positioned in the internal axial bore rearward of the second oil flow bore on one of the stator support flange and the rearward portion, the first oil seal groove constructed and arranged to receive a first oil seal for establishing a sealing engagement between the stator support shaft and the input shaft and for blocking an axial flow of the oil from the torque converter between the stator support shaft and the input shaft and forcing that flow of oil into the second oil flow bore.

13. The automatic transmission of claim 12, wherein the stator support flange includes a forward portion extending radially outwardly from the internal axial bore, the stator support flange forward portion having an outer diameter less than a maximum diameter of the stator support flange but greater than a diameter of the stator support shaft between the forward engagement portion and the stator support flange; an axially extending portion of the first oil flow bore being forwardly routed through the stator support flange forward portion with an outlet of the first oil flow bore positioned radially outwardly from the diameter of the stator support shaft between the forward engagement portion and the stator support flange.

14. The automatic transmission of claim 12, wherein the second oil flow bore is positioned entirely axially forward of a rearward face of the stator support flange and the first internal circumferential oil seal groove is positioned immediately adjacent the second oil flow bore rearward of the second oil flow bore.

15. The automatic transmission of claim 12, wherein:
the at least one oil flow bore of the stator support flange includes a third oil flow bore connecting the internal axial bore with an exterior of the stator support shaft for allowing oil to flow from an exterior of the shaft to the internal axial bore, the third oil flow bore having a first portion positioned in the stator support flange to receive oil from an exterior of the stator support shaft, the first portion connecting to a second portion positioned in the radially outwardly extending portion of the rearward portion of the stator support shaft to supply oil to a clutch hub and drum bushing for lubrication.

16. The automatic transmission of claim 15, wherein the stator support flange includes a forward portion extending radially outwardly from the internal axial bore, the stator support flange forward portion having an outer diameter less than a maximum diameter of the stator support flange but greater than a diameter of the stator support shaft between the forward engagement portion and the stator support flange; an axially extending portion of the first oil flow bore being forwardly routed through the stator support flange forward portion with an outlet of the first oil flow bore positioned radially outwardly from the diameter of the stator support shaft between the forward engagement portion and the stator support flange.

17. The automatic transmission of claim 16, wherein the second oil flow bore is positioned entirely axially forward of a rearward face of the stator support flange and the first internal circumferential oil seal groove is positioned immediately adjacent the second oil flow bore rearward of the second oil flow bore.

18. The automatic transmission of claim 12, and further comprising:
a second internal circumferential oil seal groove positioned in the internal axial bore of the rearward portion of the stator support shaft rearward of the first oil seal groove, the second oil seal groove constructed and arranged to receive a second oil seal for establishing a sealing engagement between the stator support shaft and the input shaft and creating an oil chamber between the stator support shaft, the input shaft and the first oil seal.

19. The automatic transmission of claim 18, wherein:
the at least one oil flow bore of the stator support flange includes a third oil flow bore connecting the internal axial bore with an exterior of the shaft for allowing oil to flow from an exterior of the stator support shaft to the internal axial bore, the third oil flow bore having a first portion positioned in the stator support flange to receive oil from an exterior of the stator support shaft, the first portion connecting to a second portion positioned in the radially outwardly extending portion of the rearward portion of the stator support shaft to supply oil to a clutch hub and drum bushing for lubrication.

20. The automatic transmission of claim 19, wherein:
the second portion of the third oil flow bore also connects to an interior of the stator support shaft between the first and second oil seal grooves to supply oil to the oil chamber, wherein the oil chamber is axially positioned to connect to an input shaft oil flow bore positioned in the input shaft and pass oil from the exterior of the stator support shaft to the input shaft oil flow bore.

21. The automatic transmission of claim 20, wherein:
the at least one oil flow bore of the stator support flange includes a fourth oil flow bore connecting between a pressurized oil source external of the stator support shaft and the clutch drum to pressurize a clutch pack, the fourth oil flow bore having a first portion positioned in the stator support flange and connecting to a second portion positioned in the radially outwardly extending portion of the rearward portion of the stator support shaft to connect to an oil passage in the clutch drum.

22. The automatic transmission of claim 21, and further comprising:
a pair of oil seals positioned on opposite sides of the connection between the fourth oil flow bore and the oil passage in the clutch drum to seal such connection.

\* \* \* \* \*